(12) United States Patent
Disser et al.

(10) Patent No.: US 8,070,376 B2
(45) Date of Patent: Dec. 6, 2011

(54) SYSTEM FOR CONNECTING A SHAFT TO A JOINT

(75) Inventors: Claus Disser, Seligenstadt (DE); Manfred Niederhüfner, Hanau (DE)

(73) Assignee: Shaft-Form-Engineering GmbH, Hausach (DE)

( * ) Notice: Subject to any disclaimer, the term of this patent is extended or adjusted under 35 U.S.C. 154(b) by 305 days.

(21) Appl. No.: 10/571,355

(22) PCT Filed: Jul. 2, 2004

(86) PCT No.: PCT/EP2004/007181
§ 371 (c)(1),
(2), (4) Date: Mar. 31, 2006

(87) PCT Pub. No.: WO2005/033537
PCT Pub. Date: Apr. 14, 2005

(65) Prior Publication Data
US 2007/0032303 A1 Feb. 8, 2007

(30) Foreign Application Priority Data

Sep. 12, 2003 (DE) .................................. 103 42 497

(51) Int. Cl.
*F16D 1/072* (2006.01)
(52) U.S. Cl. ................ 403/282; 403/359.1; 403/DIG. 7
(58) Field of Classification Search ................... 403/282, 403/359.1, 359.2, 359.5, 359.6, 313, DIG. 7; 464/179
See application file for complete search history.

(56) References Cited

U.S. PATENT DOCUMENTS

| 4,185,475 A | * | 1/1980 | Kleinschmidt et al. | ........ 403/313 |
| 4,303,149 A | * | 12/1981 | Lech, Jr. | ..................... 403/359.5 |
| 4,330,914 A | * | 5/1982 | Hood | .............................. 403/282 |
| 4,352,586 A | * | 10/1982 | Hayden | .......................... 403/377 |
| 4,630,834 A | * | 12/1986 | Muller et al. | .................. 464/173 |
| 4,886,392 A | * | 12/1989 | Iio | .................................. 403/282 |
| 5,085,548 A | * | 2/1992 | Moyles | |
| 5,107,569 A | * | 4/1992 | Hughes | |
| 5,131,785 A | * | 7/1992 | Shimazaki | .................... 403/326 |
| 5,522,669 A | | 6/1996 | Recker | |

(Continued)

FOREIGN PATENT DOCUMENTS

DE 32 27 969 C2 2/1984

(Continued)

OTHER PUBLICATIONS

"The Seeger Handbook", Seeger Orbis GmbH, 1984, pp. 2-3, 26-27.

*Primary Examiner* — Victor MacArthur
(74) *Attorney, Agent, or Firm* — Collard & Roe, P.C.

(57) ABSTRACT

A system for connecting a shaft to a joint, and a corresponding method are provided, wherein a shaft journal embodied on the end of the shaft that is to be connected to the joint can be inserted into a recess of a joint connection. The aim of the invention is to be able to pre-assemble and axially align the shaft and the recess in a simple manner. To this end, the shaft journal and the recess are adapted to each other in such a way that the shaft journal can be displaced in the recess in an essentially weak manner in a first section T1 of the insertion path E, and a large amount of force is expended for the displacement of the shaft journal in the recess in a section T2 of the insertion path E.

6 Claims, 4 Drawing Sheets

U.S. PATENT DOCUMENTS

| | | | |
|---|---|---|---|
| 5,716,156 A | * | 2/1998 | Bayer et al. .................. 403/282 |
| 5,718,151 A | * | 2/1998 | Parrish et al. ............. 403/359.1 |
| 2004/0200674 A1 | * | 10/2004 | Campbell |

FOREIGN PATENT DOCUMENTS

| | | | |
|---|---|---|---|
| DE | 37 28 119 | | 3/1989 |
| DE | 40 33 275 C2 | | 4/1992 |
| DE | 4345099 A1 | * | 7/1995 |
| DE | 295 16 626 | | 3/1996 |
| EP | 0 936 086 A | | 8/1999 |
| FR | 2 712 049 | | 5/1995 |
| GB | 651 603 A | | 4/1951 |
| JP | 9-68233 | | 3/1997 |
| JP | 2001 001710 A | | 1/2001 |
| JP | 2001343023 A | * | 12/2001 |

* cited by examiner

US 8,070,376 B2

SYSTEM FOR CONNECTING A SHAFT TO A JOINT

CROSS REFERENCE TO RELATED APPLICATIONS

Applicants claim priority under 35 U.S.C. §119 of German Application No. 103 42 497.0 filed Sep. 12, 2003. Applicants also claim priority under 35 U.S.C. §365 of PCT/EP2004/007181 filed Jul. 2, 2004. The international application under PCT article 21(2) was not published in English.

BACKGROUND OF THE INVENTION

1. Field of the Invention

The present invention relates to a system for connecting a shaft to a joint, in which a shaft journal configured on the end of the shaft to be connected with the joint can be inserted into a recess of a joint connection, as well as to a corresponding method.

2. Prior Art

The connection system according to the invention can be used, for example, in the case of a homokinetic joint having a central recess, in which the joint connection is formed by the inner hub of the joint. Such a joint is known from DE 32 27 969 C2, in which a drive shaft is accommodated in the bore of the inner joint body and transfers the torque by means of a longitudinal tooth system. Furthermore, a rotary homokinetic joint is described in DE 40 33 275 C2, which has an outer joint part and an inner joint part, whereby the inner joint part is connected with a rotating shaft by way of a tapered tooth system. In order to achieve an approximately play-free connection between the shaft and the joint, the shaft journals and the recess of the joint connection, i.e. the intended tooth system, must be adapted to one another with a precise fit, so that when the shaft journal is inserted into the recess, great friction forces must be overcome. This requires the use of complicated tools during assembly, in order to push the shaft into the recess of the joint connection precisely in the axial direction.

Since such homokinetic joints are used, for example, in motor vehicles, which are produced on an assembly line, in mass production, such a complicated assembly is connected with significant disadvantages and costs, particularly since there is always the risk that the shaft will not be connected with the joint with sufficient precision in the axial direction.

SUMMARY OF THE INVENTION

Therefore it is the task of the present invention to make it possible to connect a shaft to a joint, in which the assembly is simplified and operation of the joint is made possible without noteworthy radial play.

This task is accomplished, according to the invention, in the case of a connection system of the type stated initially, essentially in that the shaft journal and the recess are adapted to one another in such a manner that in a first part of the insertion path, it is possible to displace the shaft journal in the recess essentially without force, and in a second part of the insertion path, a great expenditure of force must be applied for displacement of the shaft journal in the recess. In this connection, a displacement essentially without force means that this displacement can be performed by hand, essentially without any additional tool. This allows pre-assembly by hand, and therefore contributes to significant simplification of connecting the shaft to the joint. In particular, by means of this manual pre-assembly, a good pre-alignment of shaft journal and preferably central recess is already achieved. Only in a second part of the insertion path must a greater expenditure of force be applied, using tools, which expenditure is brought about by means of greater friction of the shaft journal in the recess. Because of the extensive pre-assembly by hand, however, assembly in the second part of the insertion path can be performed with relatively simple tools. Furthermore, the shaft is already aligned correctly in the recess of the joint, in the axial direction, because of the pre-assembly, so that no tilting of the shaft in the recess occurs during further insertion.

For this purpose, it is provided, according to an advantageous embodiment of the invention, that the first part of the insertion path amounts to at least approximately 50% of the total insertion path. Particularly preferably, the first part of the insertion path actually amounts to 60 to 70% of the total insertion path. The second part of the insertion path represents the difference from the total insertion path. However, depending on the configuration of the outer surface of the shaft journal and the inner surface of the recess, in which a tooth system is provided, for example, the optimal percentage division between the first and the second part of the insertion path can also lie outside the stated range, according to the invention.

According to a preferred embodiment of the present invention, the essentially force-free displacement is achieved in that radial play exists between a front section of the shaft journal and an entry section of the central recess, in the first part of the insertion path. This has the result that in this first part of the insertion path, practically no friction occurs between the shaft journal and the recess, so that force-free displacement of the shaft journal in the recess is possible. In the second part of the insertion path, the shaft journal and the recess are then configured to fit precisely with one another, according to the invention, so that great friction forces act in this region, which require a great expenditure of force for inserting the shaft journal into the recess, and lead to a play-free connection between shaft and joint. For example, in an embodiment of the invention, the shaft journal is displaced in the recess essentially with a force which is comparatively low in regard to a great expenditure of force, which must be applied in a second part of the insertion path for displacement of the shaft journal in the recess for connecting the shaft to the joint. For this purpose, the outer surface of the shaft journal and/or the inner surface of the central recess can be configured in steps, in a manner coordinated with one another.

In a further development of the connection system, a radial play between the shaft journal and the recess can constantly decrease over the course of the second part. This has the result that the expenditure of force that must be applied in the second part of the insertion path increases with the insertion depth. For this purpose, the outer surface of the shaft journal and/or the inner surface of the central recess can be configured conically, particularly in the second part of the insertion path, whereby the conicity of shaft journal and recess can be different. Thus, the expenditure of force can be precisely adapted to the requirements, and particularly good centering of the shaft in the preferably central recess of the joint can be achieved.

In order to ensure a reliable transfer of force from the shaft to the joint in the case of a rotary homokinetic joint, for example, a profiling for a transfer of torque can be provided on the outer surface of the shaft journal and the inner surface of the recess, which profiling is configured, for example, as a tooth system.

Preferably, the shaft journal and/or the recess can also have an end stop that indicates the end of the insertion path and reliably delimits it. For this purpose, the shaft can have a flange at the transition to the shaft journal, which flange rests against the face of the joint connection after the shaft journal has been inserted into the central recess.

In order to prevent the shaft journal from slipping out of the recess, something that can be provoked by impacts on the joint connection or other shocks, for example, the shaft journal can be made so that it can be locked in place in the recess, against axial displacement, according to the invention. This can be done by means of a cotter pin, a sleeve nut that is attached to the shaft, which can be screwed onto an outside thread of the joint connection, several screws that can be inserted through a flange on the shaft and fixed in place in a face of the joint connection, or the like.

According to another embodiment of the present invention, the shaft journal can be fixed in place in the recess by means of a split ring, which is guided in an outer groove of the joint connection, for example, and engages into a groove formed in the shaft journal through openings provided in the joint connection.

Furthermore, it can be provided, according to the invention, that a placement point for a tool is provided on the ball hub and/or shaft. This can be a flange, a groove, a sleeve nut, or the like.

Furthermore, the present invention relates to a method for connecting a shaft to a joint, by means of the connection system described above, which is characterized, in particular, in that the shaft journal of the shaft is inserted by hand, for pre-assembly, in the first part of the insertion path, and inserted into the recess, using a tool, in the second part of the insertion path, with which tool the required expenditure of force can be applied. For this purpose, a fork wrench, for example, can be applied to a flange of the shaft and push it into the joint connection, or to a groove of the ball hub, and push it onto the shaft journal under robot control. Alternatively, a sleeve nut could also be tightened using a fork wrench.

Additional characteristics, advantages, and application possibilities of the present invention are evident from the following description of exemplary embodiments, using the drawing. In this connection, all of the characteristics described and/or shown in the figures are an object of the present invention, in and of themselves, even independent of how they are combined in the claims or their antecedents.

BRIEF DESCRIPTION OF THE DRAWINGS

The drawings show

DETAILED DESCRIPTION OF THE DRAWINGS

Figure 1A:
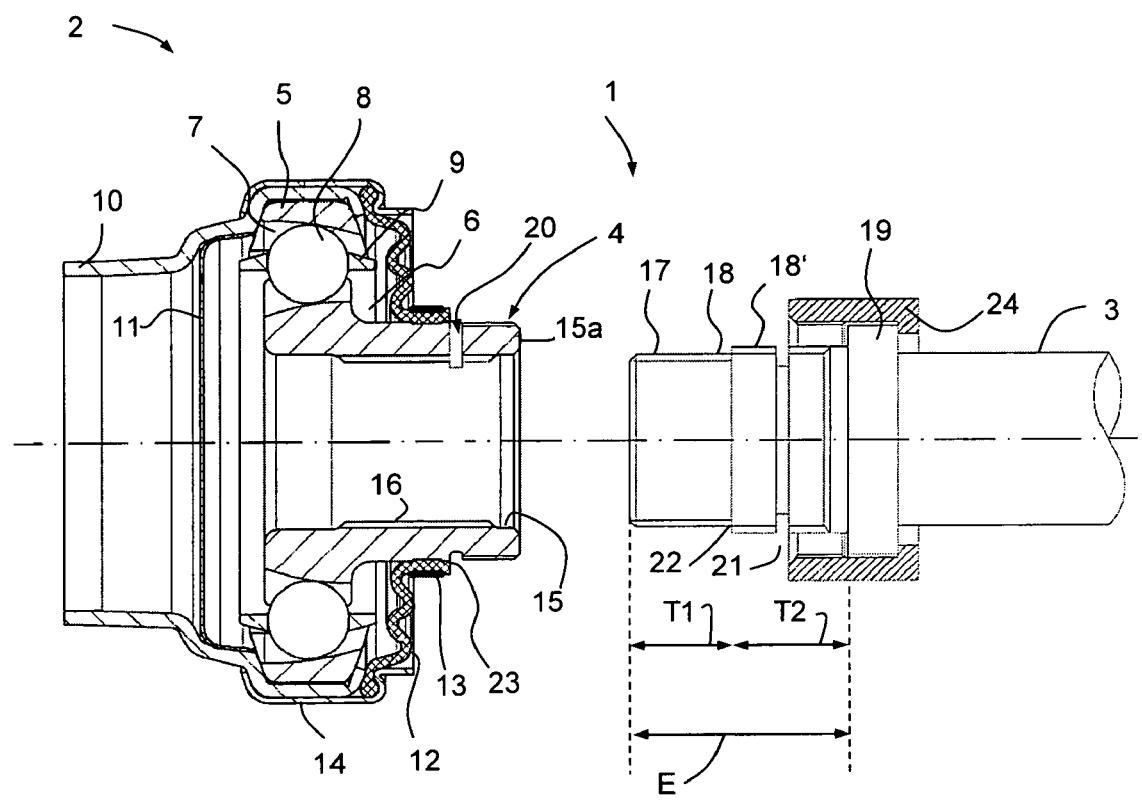
FIG. 1a a shaft to be connected with a homokinetic joint shown schematically in cross-section, according to a first embodiment.
Figure 1B:
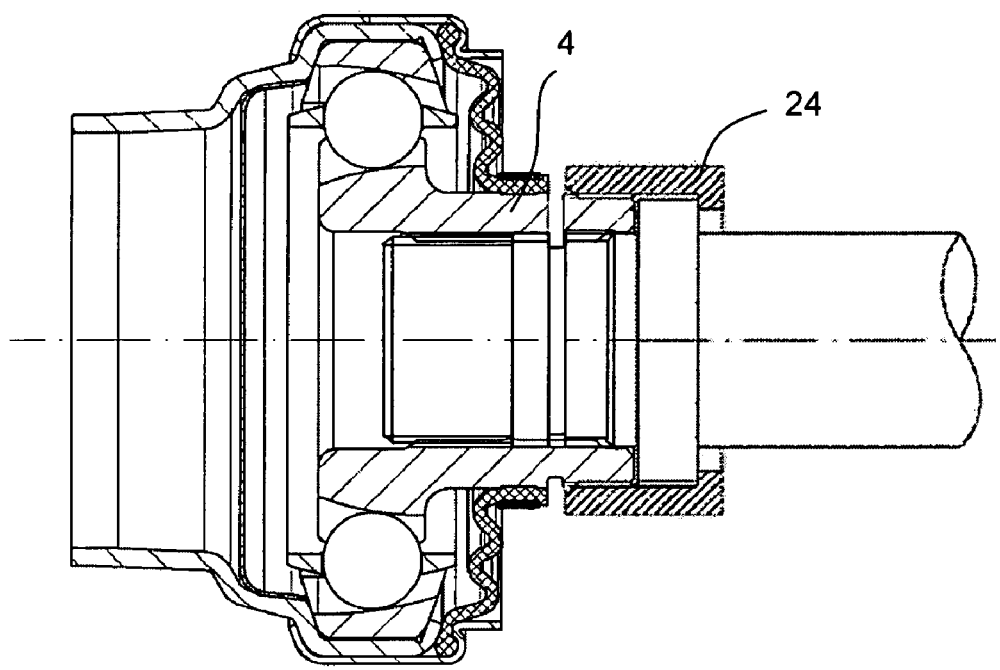
FIG. 1b the shaft of FIG. 1a having a sleeve nut provided with a thread engaging a thread formed on an outside of an inner hub.
Figure 1C:
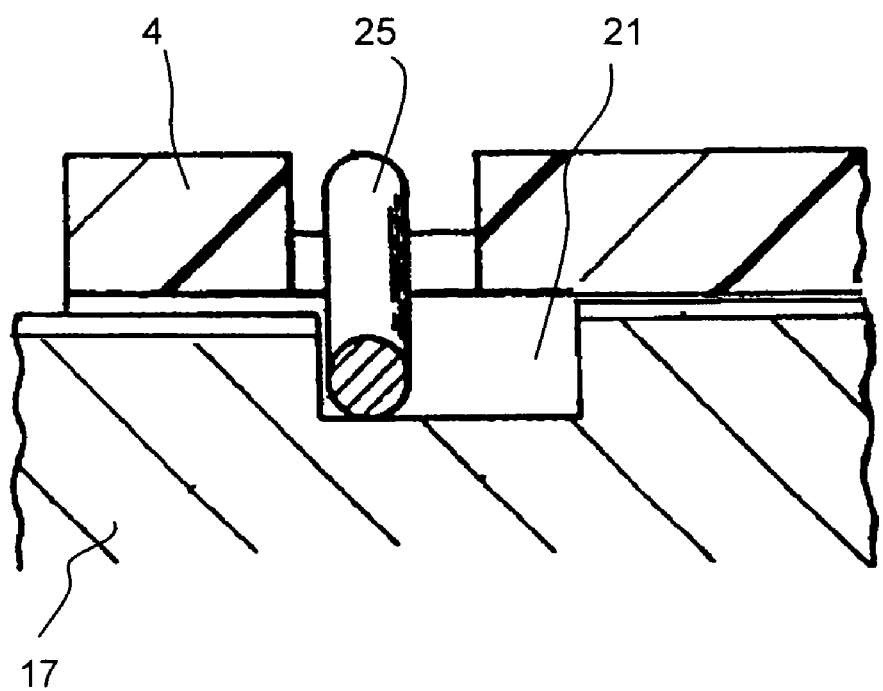
FIG. 1c a connection system with a split ring.

The connection system 1 shown in FIG. 1 consists of a fixed homokinetic joint 2, configured as a rotary joint, and a shaft 3 for being connected to the joint 2, which has an inner hub 4 and an outer hub 5. Tracks 6 and 7, respectively, assigned to one another in pairs, in each instance, and in which balls 8 are accommodated, are provided in the inner hub 4 and the outer hub 5. The balls 8 are guided in a cage 9. For this purpose, the cage 9 has windows distributed over its circumference, in accordance with the number of balls 8.

In the embodiment shown, the outer hub 5 is surrounded by a carrier housing 10, with a non-positive or positive lock. To seal the joint 2, a closure lid 11 is inserted into the carrier housing 10, which lid prevents the penetration of dirt particles into the joint 2, or the loss of lubricant, without providing additional sealing elements. On the side opposite the balls 8, the joint 2 is sealed by means of a set of bellows 12, which is fixed in place on the inner hub 4, at its radially inner edge, by means of a tie. The radially outer edge of the set of bellows 12 is attached to a cap 14 that surrounds the carrier housing 10 and the outer hub 5, by means of crimping.

For a connection to a driven shaft 3 or a shaft 3 to be driven, the inner hub 4 that serves as the joint connection has a central recess 15 that is provided with a profiling 16 for transferring torque. In this manner, the inner hub 4 can be set onto a shaft journal 17 of the shaft 3, for assembly of the joint 2. For this purpose, a profiling 18, 18' that corresponds to the profiling 16 of the recess 15 is formed on the shaft journal 17, which profiling engages into the profiling 16 and allows transfer of torque. In this connection, the profilings 16, 18, 18' can be configured in the form of a tooth system, for example. A particular advantage of this arrangement consists in the fact that the joint 2 can be completely assembled before it is connected to the shaft 3.

For this purpose, the shaft journal 17 is inserted into the central recess 15 until a flange 19, configured as an end stop at the transition between the shaft journal 17 and the shaft 3, comes up against the outer face of the inner hub 4 at an end stop 15a. In this position, the shaft 3 is fixed in place in the inner hub 4, in the axial direction, by means of a split ring 25 or the like. For this purpose, the split ring 25 is set onto a groove 20 provided on the outside of the inner hub 4. The inner hub 4 is partially perforated in the region of the groove 20, so that the split ring 25 engages into a correspondingly configured groove 21 in the shaft journal 17, through this perforation, and secures the shaft 3 to prevent axial slipping. Instead of this method of fixation, the shaft 3 can also be fixed in place on the joint 2 in another manner, according to the invention. A placement point 23 for a tool may be provided on the shaft 3 or joint connection 4. This placement point 23 may be a flange, a groove, a sleeve nut or the like. For example, a sleeve nut 24 can be set over the flange 19, the thread of which engages in a thread formed on the outside of the inner hub 4. Alternatively to this, passage bores can be provided in the flange 19, in the axial direction, which correspond to threaded openings in the face of the inner hub 4, so that the shaft 3 can be screwed onto the inner hub 4 of the joint 2.

In this connection, the shaft journal 17 is adapted to the central recess 15 in such a manner that in a first part T1 of the insertion path E, essentially force-free displacement of the shaft journal 17 in the recess 15 is possible, and in a second part T2 of the insertion path E, a great expenditure of force must be applied for the displacement of the shaft journal 17 in the recess 15.

This is achieved in that a front section of the cylindrical shaft journal 17, corresponding to the first part T1, has a smaller outside diameter as compared with the inside diameter of the recess 15. As a result, there is radial play between the shaft journal 17 and the recess 15 in the first part T1 of the insertion path E, when the shaft 3 is being inserted, so that the shaft journal 17 can be inserted into the recess 15 without noteworthy friction forces, in this part.

At the transition to the second part T2 of the insertion path E, a step 22 is provided on the shaft journal 17, at which step the shaft journal 17 makes a transition to a larger outside diameter. This outside diameter in the second part T2 corresponds with a precise fit to the inside diameter of the central recess 15. In this second part T2 of the insertion path E, the shaft journal 17 can therefore be pushed into the central recess 15 only with a great expenditure of force, since a great friction force must be overcome. For this purpose, a fork wrench, not shown, can be used, for example, which engages on the flange 19 from the side of the shaft 3, and presses the shaft 3 into the recess 15. In the case of a sleeve nut 24, the insertion of the shaft journal 17 into the recess 15 in the second part T2 of the insertion path E can take place by means of screwing the sleeve nut 24 onto the inner hub 4. In the latter case, the shaft journal 17 can be pushed into the recess 15 without force, until the sleeve nut 24 engages onto the thread.

By means of this adaptation of shaft journal 17 and recess 15, the result is achieved that essentially force-free pre-assembly by hand is made possible, after which the shaft journal 17 is already guided securely in the recess 15. In this way, tilting of shaft 3 and inner hub 4 is prevented when force is applied for further insertion, by means of which a play-free connection between shaft 3 and joint 2 is produced.

Figure 2A:
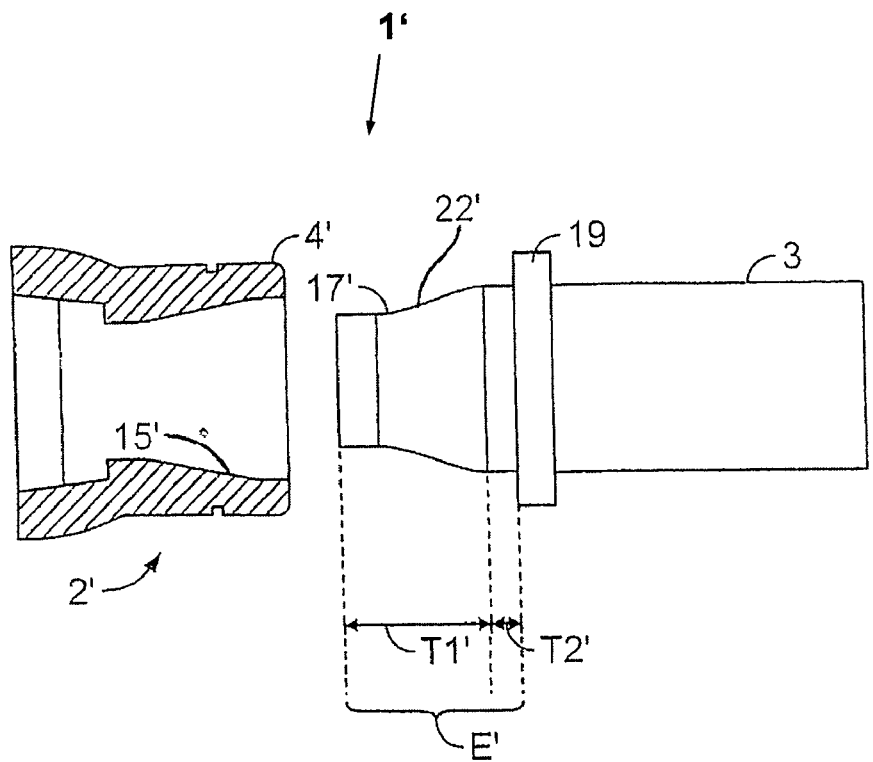
FIG. 2a a shaft to be connected with a joint connection shown schematically in cross-section, according to a second embodiment.
Figure 2B:
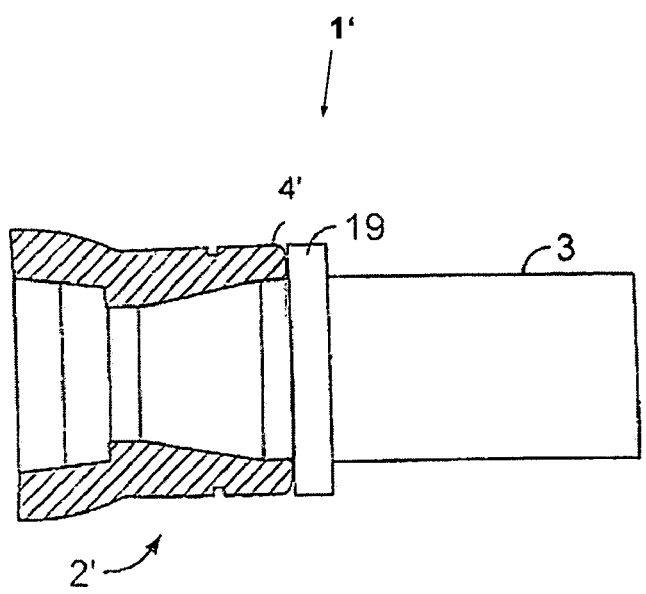
FIG. 2b a connection system according to an embodiment of the invention wherein the shaft journal has been inserted into a central recess of the joint connection element and an end stop comprising a flange provided on the shaft at a transition to the shaft journal rests against a face of the joint connection element.

FIG. 2a shows another embodiment of a connection system 1' according to the invention, whereby only the inner hub 4' without profiling is shown of the joint 2', for the sake of simplicity. This embodiment differs from the connection system 1 described above in that the inner surface of the recess 15' is also adapted to the structure of the shaft journal 17', and the step 22' in the shaft journal 17' is configured as a conical transition. Otherwise, the characteristics described in connection with the connection system 1 can also be configured in the case of the connection system 1'.

In the case of the connection system 1', an essentially force-free displacement of the shaft journal 17' in the recess 15' is also possible in the first part T1' of the insertion path E'. Only in the second part T2' of the insertion path, in which the shaft journal 17' is adapted to the recess 15' with a precise fit, is increased expenditure of force required. In this embodiment, the shaft journal 17' is mounted in the recess 15' without play, both in the front and in the rear region. This results in a particularly stable connection of the shaft 3 to the joint 2. In the region of the conically narrowing step 22', it can be provided that the recess 15' narrows conically to a slightly greater degree than the shaft journal 17'. In this way, a constantly increasing expenditure of force becomes necessary in the region of the second part T2' of the insertion path E', and particularly good, tilt-free centering of the shaft 3 is achieved.

However, the present invention is not limited to the embodiments of shaft journal and recess shown in the exemplary embodiments. These can be freely adapted to individual requirements by a person skilled in the art. Thus, for example, the shaft journal and/or the recess can be configured to be conical from their front end, in each instance, to their back end, in each instance. This embodiment can be produced in particularly simple manner. Also, instead of the end stop configured as a flange 19, a corresponding projection can be provided in the recess, for example.

REFERENCE SYMBOL LIST

1, 1' connection system
2, 2' joint, fixed homokinetic joint
3 shaft
4, 4' joint connection, inner hub
5 outer hub
6 track of the inner hub
7 track of the outer hub
8 balls
9 cage
10 carrier housing
11 closure lid
12 set of bellows
13 tie
14 cap
15, 15' recess
15a end stop of recess
16 profiling of the recess
17, 17' shaft journal
18, 18' profiling of the shaft journal
19 flange, end stop
20 groove
21 groove
22, 22' step
23 placement point in joint connection
24 sleeve nut
25 split ring
E, E' insertion path
T1,T1' first part of the insertion path
T2,T2' second part of the insertion path

The invention claimed is:

1. A connection system comprising a shaft and a joint, said shaft comprising a shaft journal configured on an end of the shaft to be connected with the joint, and said joint comprising an inner hub having a recess for insertion of said shaft journal, and an outer hub, wherein the shaft journal and the recess are adapted to one another in such a manner that in a first part of an insertion path, the shaft journal is displaced in the recess essentially with a force which is comparatively low in regard to a great expenditure of force, which must be applied in a second part of the insertion path for displacement of the shaft journal in the recess for connecting said shaft to said joint, and wherein the system further comprises a sleeve nut for locking the shaft journal in place in the recess, against axial displacement and wherein radial play exists between a front section of the shaft journal and an entry section of the recess, in the first part of the insertion path, and that in the second part of the insertion path, the shaft journal and the recess are configured to fit precisely with one another, and wherein a radial play between the shaft journal and the recess decreases over the second part of the insertion path by means of a conical configuration of at least one of an outer surface of the shaft journal and an inner surface of the recess, and wherein a profiling for a transfer of torque is provided on the outer surface of the shaft journal and the inner surface of the recess, said profiling provided on the outer surface of the shaft journal being provided on the front section of the shaft journal corresponding to the first part of the insertion path, the profiling provided on the front section of the shaft journal corresponding to and engaging a respective profiling of the recess, and wherein the sleeve nut is provided with a thread which engages in a thread formed on an outside of the inner hub.

2. Connection system according to claim 1, wherein the first part of the insertion path amounts to at least 50% of the total insertion path.

3. Connection system according to claim 1, wherein the inner hub has an end stop.

4. Connection system according to claim 1, wherein the recess is a central recess and an end stop comprising a flange is provided on the shaft at a transition to the shaft journal, wherein the flange rests against a face of the inner hub if the shaft journal is inserted into the central recess of the inner hub.

5. Connection system according to claim 1, wherein a placement point for a tool is provided on the shaft and/or on the joint.

6. A connection system comprising a shaft and a joint, said shaft comprising a shaft journal configured on an end of the shaft to be connected with the joint and said joint comprising an inner hub having a recess for insertion of said shaft journal and an outer hub, wherein the shaft journal and the recess are adapted to one another in such a manner that in a first part of an insertion path, the shaft journal is displaced in the recess essentially with a force which is comparatively low in regard to a great expenditure of force which must be applied in a second part of the insertion path for displacement of the shaft journal in the recess for connecting said shaft to said joint and wherein the system further comprises a split ring for locking the shaft journal in place in the recess, against axial displacement and wherein radial play exists between a front section of the shaft journal and an entry section of the recess, in the first part of the insertion path, and that in the second part of the insertion path, the shaft journal and the recess are configured to fit precisely with one another, and wherein a radial play between the shaft journal and the recess decreases over the second part of the insertion path by means of a conical configuration of at least one of an outer surface of the shaft journal and an inner surface of the recess, and wherein a profiling for a transfer of torque is provided on the outer surface of the shaft journal and the inner surface of the recess, said profiling provided on the outer surface of the shaft journal being provided on the front section of the shaft journal corresponding to the first part of the insertion path, said profiling provided on the front section of the shaft journal corresponding to and engaging a respective profiling of the recess, and wherein the inner hub has on an outside a groove for receiving said split ring, and wherein the inner hub is partially perforated in a region of the groove so that said split ring engages through a perforation, into the shaft journal.

* * * * *